United States Patent
Wong et al.

(10) Patent No.: US 9,705,635 B2
(45) Date of Patent: Jul. 11, 2017

(54) APPARATUS AND METHOD TO IDENTIFY USER EQUIPMENT PERFORMANCE AND TO OPTIMIZE NETWORK PERFORMANCE VIA BIG DATA

(71) Applicants: AT&T Mobility II LLC, Atlanta, GA (US); AT&T Intellectual Property I, L.P., Atlanta, GA (US)

(72) Inventors: Tony Wong, Dallas, TX (US); Wei Yuan, Plano, TX (US); Sheldon Kent Meredith, Marietta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 136 days.

(21) Appl. No.: 14/640,416

(22) Filed: Mar. 6, 2015

(65) Prior Publication Data
US 2016/0262166 A1    Sep. 8, 2016

(51) Int. Cl.
H04W 72/08    (2009.01)
H04L 1/00    (2006.01)

(52) U.S. Cl.
CPC .......... *H04L 1/0026* (2013.01); *H04L 1/0015* (2013.01); *H04L 1/0003* (2013.01); *H04L 1/0009* (2013.01)

(58) Field of Classification Search
None
See application file for complete search history.

(56) References Cited

U.S. PATENT DOCUMENTS

| | | |
|---|---|---|
| 8,526,519 B2 | 9/2013 | Chen et al. |
| 8,644,289 B2 | 2/2014 | Zhu et al. |
| 8,687,555 B2 | 4/2014 | Ko et al. |
| 8,780,863 B2 | 7/2014 | Cheng et al. |
| 8,811,516 B2 | 8/2014 | Koivisto et al. |
| 8,837,301 B2 | 9/2014 | Krishnamurthy |
| 8,913,518 B2 | 12/2014 | Heo et al. |

(Continued)

OTHER PUBLICATIONS

Xu, Xiang, Mingjian Ni, and Rudolf Mathar. "Improving QoS by predictive channel quality feedback for LTE." *Software, Telecommunications and Computer Networks (SoftCOM), 2013 21st International Conference on.* IEEE, 2013.

(Continued)

*Primary Examiner* — Hassan Kizou
*Assistant Examiner* — Hashim Bhatti (57) ABSTRACT

Methods, computer-readable media and apparatuses to identify UE performance and to optimize network performance are disclosed. A processor receives a reported channel quality indicator value from a user equipment, wherein the reported channel quality indicator value is used for setting an initial modulation and an initial coding rate, determines a calibrated channel quality indicator value based on historical data for the user equipment and applies the calibrated channel quality indicator value that determines a calibrated modulation and a calibrated coding rate instead of the initial modulation and the initial coding rate based on the channel quality indicator value received from the user equipment, wherein the receiving, the determining and the applying are continuously performed while the user equipment is in a radio resource control connected mode.

18 Claims, 4 Drawing Sheets

(56) References Cited

U.S. PATENT DOCUMENTS

| | | |
|---|---|---|
| 8,929,235 B2 | 1/2015 | Baldemair et al. |
| 2006/0089104 A1* | 4/2006 | Kaikkonen ........... H04W 72/08 |
| | | 455/67.13 |
| 2008/0004030 A1* | 1/2008 | Frederiksen .......... H04W 24/10 |
| | | 455/450 |
| 2009/0196237 A1* | 8/2009 | Jonsson ................ H04L 1/0033 |
| | | 370/329 |
| 2010/0067396 A1* | 3/2010 | Cui ....................... H04L 1/0026 |
| | | 370/252 |
| 2010/0080176 A1* | 4/2010 | Maas .................... H04L 1/0034 |
| | | 370/329 |
| 2010/0098012 A1 | 4/2010 | Bala et al. |
| 2010/0113028 A1* | 5/2010 | Simonsson ........... H04L 1/0019 |
| | | 455/437 |
| 2011/0141941 A1 | 6/2011 | Lee et al. |
| 2012/0113846 A1 | 5/2012 | Narasimha et al. |
| 2013/0107782 A1* | 5/2013 | Anas ..................... H04W 52/02 |
| | | 370/311 |
| 2013/0242769 A1 | 9/2013 | Hammarwall et al. |
| 2014/0233419 A1 | 8/2014 | Cheng et al. |
| 2015/0201428 A1* | 7/2015 | Mills .................... H04L 1/0026 |
| | | 455/452.2 |

OTHER PUBLICATIONS

Ibrahim, Maine. "Channel Quality Indicator Feedback in Long Term Evolution (LTE) System.".

* cited by examiner

FIG. 1

CQI TABLE 202

| CQI INDEX | MODULATION | CODING RATE x 1024 | EFFICIENCY |
|---|---|---|---|
| 0 | OUT OF RANGE | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4053 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

APPARATUS AND METHOD TO IDENTIFY USER EQUIPMENT PERFORMANCE AND TO OPTIMIZE NETWORK PERFORMANCE VIA BIG DATA

The present disclosure relates generally to communication networks and, more particularly, to an apparatus, method and a computer-readable medium for optimizing network performance.

BACKGROUND

In today's network deployments, one of the key objectives is to improve a user's experience (e.g., faster data throughput, less dropped calls, etc.). From the operators' perspective, it is desirable to have better insights about the network. The operators would like to have visibility of the performance of the user equipment. This information would be useful for the operator to discuss with the manufacturers of the user equipment for product defects and improvements.

SUMMARY

In one example, the present disclosure discloses a method, computer-readable medium, and apparatus to identify user equipment performance and to optimize network performance. For example, the method may include a processor that receives a reported channel quality indicator value from a user equipment, wherein the reported channel quality indicator value is used for setting an initial modulation and an initial coding rate, determines a calibrated channel quality indicator value based on historical data for the user equipment and applies the calibrated channel quality indicator value that determines a calibrated modulation and a calibrated coding rate instead of the initial modulation and the initial coding rate based on the channel quality indicator value received from the user equipment, wherein the receiving, the determining and the applying are continuously performed while the user equipment is in a radio resource control connected mode.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices to identify User Equipment (UE) performance and to optimize network performance. As discussed above, one of the key objectives for network service providers is to improve a user's experience (e.g., faster data throughput, less dropped calls, etc.). From the service providers' perspective, it is desirable to have better insights about the network. The service providers would like to have visibility of the performance of the user's equipment's make, model and software release correlated to geographical data. This information would be useful for the service operator to discuss with the manufacturers of the UE for product defects and improvements.

One embodiment of the present disclosure allows a network service provider to calibrate or change a modulation and a coding rate applied to a user equipment based on historical channel quality indicator (CQI) values. For example, despite the fact that a UE may report an initial CQI value that would require an initial modulation and an initial coding rate, the historical data may suggest that the actual CQI is a different value that requires a different modulation and a different coding rate. In other words, the calibrated modulation and the calibrated coding rate that are applied may be different than the reported MCS (Modulation and Coding Scheme) that would be suggested by the CQI reported by the UE. In one embodiment, the geographic location may also be accounted for when determining the calibrated CQI for the UE based on the historical data.

In addition, the difference in the reported CQI from the UE and the calibrated CQI may be used for a variety of additional applications to further optimize the network performance. For example, the difference may be reported to the manufacturers of the UE to improve the CQI reporting capability of the UEs and to grade the user equipment's performance. Another application may be to identify weak or cold spots in network coverage of the service provider's communication network. Another application may be to calculate a composite score using the difference in CQIs as one of the components of the composite score to create a rank priority for network performance optimization.

Figure 1:
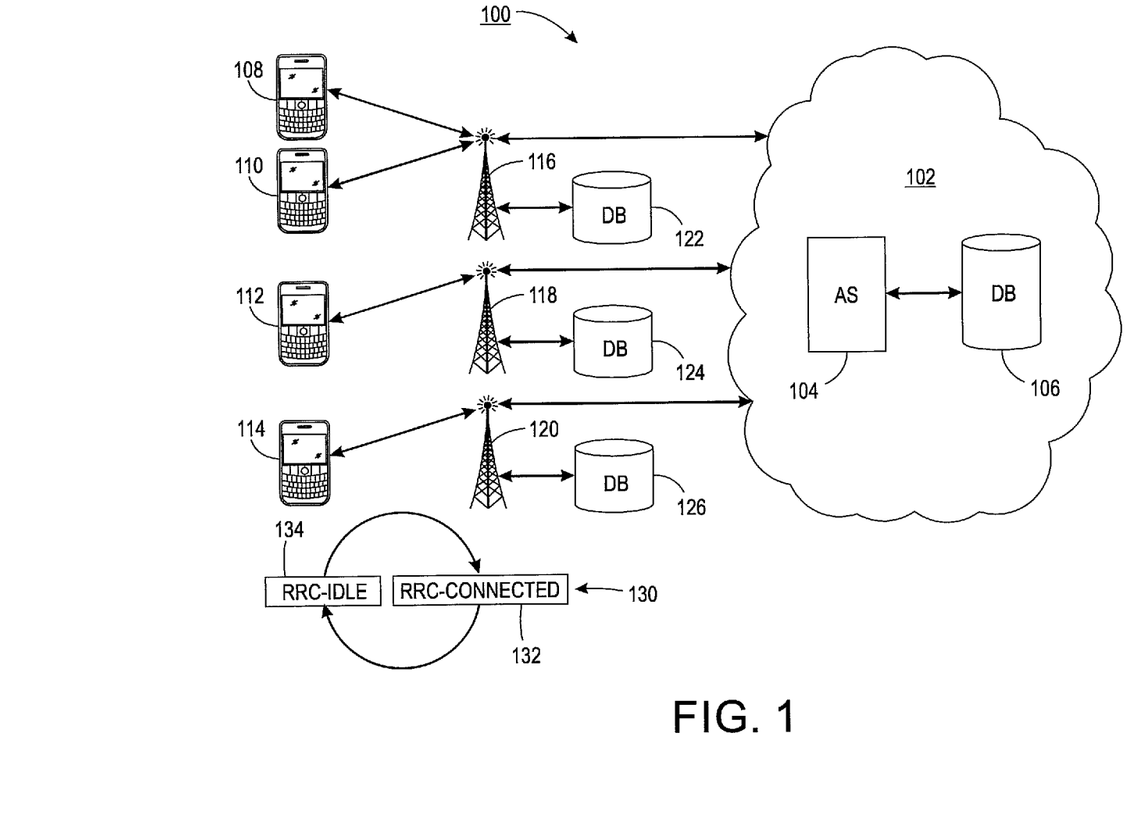
FIG. 1 illustrates an example network related to the present disclosure.

To aid in understanding the present disclosure, FIG. 1 illustrates a communication network 100. In one embodiment, the communication network 100 may include an Internet protocol (IP) network 102. The IP network 102 may include an application server (AS) 104 and a database (DB) 106. Although only a single AS 104 and a single DB 106 is illustrated in FIG. 1, it should be noted that any number of application servers and databases may be deployed.

Figure 4:
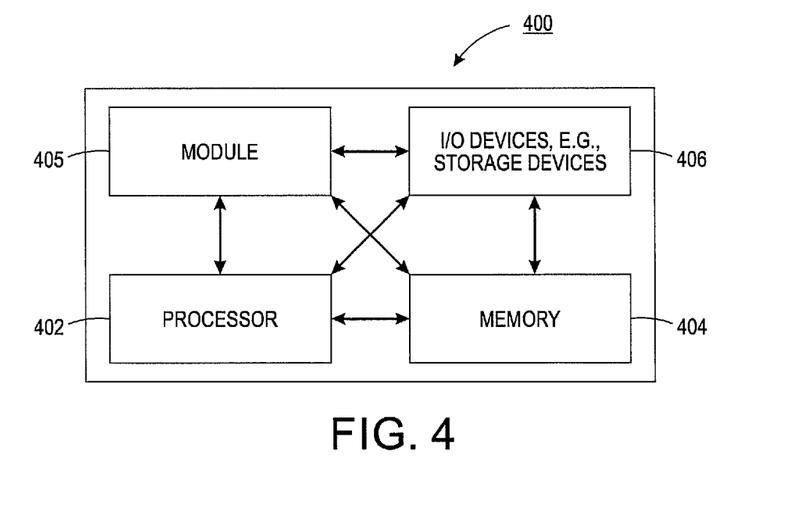
FIG. 4 illustrates a high-level block diagram of a computer suitable for use in performing the functions described herein.

In one embodiment, the AS 104 may be deployed as a computer having a processor and a memory as illustrated in FIG. 4 and discussed below. In one embodiment, the AS 104 may be configured with operations administration and maintenance (OA&M) software to pre-process the massive amounts of data that is received and to correlate CQI values to multiple dimensions (e.g., make, model and software, geographic location information, and International Mobile Station Equipment Identity (IMEI)). The AS 104 may also perform the functions described herein.

In one embodiment, the DB 106 may store historical CQI data that is collected over a period of time. The DB 106 may store a make, model and software version of the UEs and the reported CQIs from each one of the UEs, a geographic location that the CQIs were reported and a calibrated CQI value of a connection of the UEs with the IP network 102.

It should be noted that the IP network 102 has been simplified for ease of explanation. The IP network 102 may include additional network elements that are not shown, such as for example, a gateway (e.g., a serving gateway, a packet data network gateway, and the like), a firewall, a call control element, one or more access networks, an authentication, authorization and accounting server, a home subscriber server, a mobility management entity, and the like. In one embodiment, the IP network 102 may be a cellular communication network (e.g., a 3G, 4G, LTE, and the like).

In one embodiment, the communication network 100 may also include UEs 108, 110, 112 and 114 and eNodeBs 116, 118 and 120. Although four UEs 108, 110, 112 and 114 are illustrated in FIG. 1, it should be noted that any number of UEs may be deployed (e.g., more or less). Although three eNodeBs 116, 118 and 120 are illustrated in FIG. 1, it should be noted that any number of eNodeBs (e.g., more or less) may be deployed.

In one embodiment, the eNodeBs 116, 118 and 120 may be located in different geographic regions. In one embodiment, the eNodeBs 116, 118 and 120 may be modified with the OA&M software to pre-process the massive amounts of data that is received and correlate CQI values to multiple dimensions (e.g., make, model and software, geographic location information, and International Mobile Station Equipment Identity (IMEI)). The eNodeBs 116, 118 and 120 may also perform the functions described herein.

In one embodiment, the eNodeBs 116, 118 and 120 may also include an associated local database (DB) 122, 124 and 126, respectively. In one embodiment, the eNodeBs 116, 118 and 120 may store reported CQI values transmitted by the UEs 108, 110, 112 and 114 in the respective DBs 122, 124 and 126. The reported CQI values that are transmitted may be analyzed and correlated, as discussed below, to allow the eNodeBs 116, 118 and 120 to apply a calibrated CQI value based on the historical reported CQI values that are periodically transmitted by the UEs 108, 110, 112 and 114 while in a RRC connected mode 132 (as discussed in further detail below). In one embodiment, the reported CQI values stored in the DBs 122, 124 and 126 may be periodically transmitted to the DB 106.

In one embodiment, the UEs 108, 110, 112 and 114 may be any type of mobile user equipment capable of communicating with the IP network 102 via a wireless connection. In one embodiment, the user equipment 108, 110, 112 and 114 may be a smartphone, a cellular telephone, a laptop with a cellular communication capability, a tablet computer with cellular communication capability, and the like.

In one embodiment, the user equipment 108 may attempt to communicate over the IP network 102 via the eNodeB 116. To determine how the user equipment 108 should be connected, the user equipment 108 may report a CQI value to the eNodeB 116. Typically, the eNodeB 116 may simply apply an MCS rate based on the CQI received from the user equipment 108.

Figure 2:
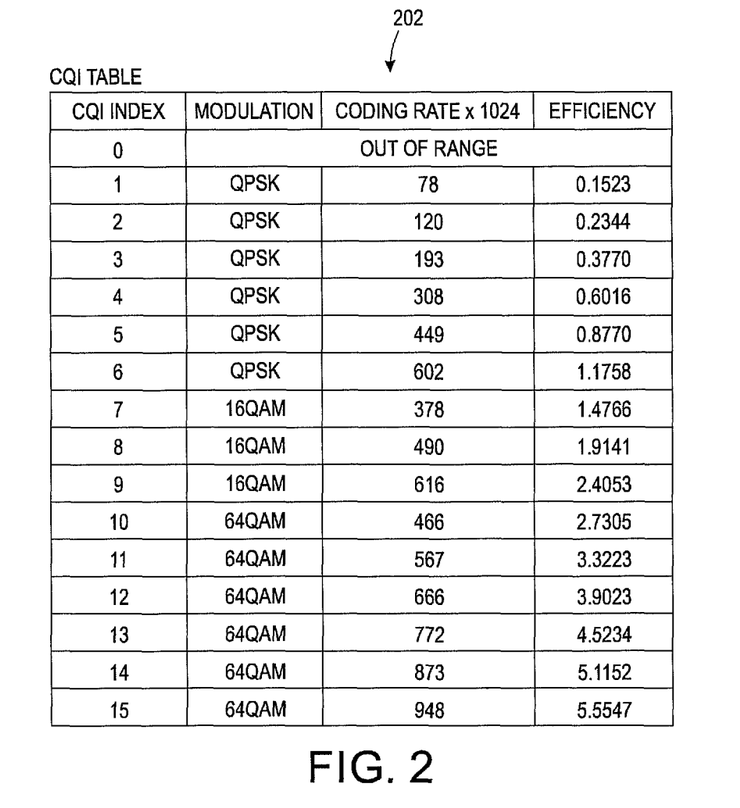
FIG. 2 illustrates an example channel quality indicator (CQI) table.

FIG. 2 illustrates an example CQI table 202 listing example MCS based on various CQI values. The CQI table 202 is an example from a 3GPP standard. The CQI table 202 is one example of a non-MIMO (Multiple Input and Multiple Output) configuration. In an example using a 2×2 MIMO configuration, each receiving antenna at the UE may experience different channel conditions from the multiple transmitting antennas at the eNodeB. Hence, the reported CQI values from each antenna of the UE may be different. In other words, the UE may have more than one antenna and each antenna may have different channel conditions, report a different CQI value and have a different MCS applied from the CQI table 202. Each MCS for a particular CQI value may have an associated efficiency or effective bit per symbol. For example, the user equipment 108 may report a CQI of 7 to the eNodeB 116. As a result, the eNodeB may apply a 16 QAM modulation with a coding rate of 378. However, the CQI value reported by the user equipment 108 is typically inaccurate. As a result, a target bit error rate (e.g., 10%) may not be reached and the actual bit error rate may be much higher or lower.

The reported CQI value from the user equipment 108 (and similarly by UEs 110, 112 and 114) represents the channel condition. The reported CQIs are calculated using a proprietary method that is unique to each different make, model and software version. Various factors may govern the CQI calculation by the user equipment 108. The factors may include proprietary algorithms and rules within a software release, a radio frequency (RF) signal level, a bit level error rate (BLER) requirement, a design and sensitivity of the user equipment 108, component variants within the user equipment 108, RF deployment, network design, and the like.

For example, two UEs made by two different manufacturers in a same geographic location may yield different reported CQI values. In another example, two different model number UEs from the same manufacturer in the same geographic location may yield different reported CQI values. In another example, the same two user equipment models from the same manufacturer running different software versions, with inconsistent component variants, in the same geographic location may yield different reported CQI values.

Furthermore, the methods used to calculate the reported CQI value is proprietary, as noted above. As a result, communication network service providers cannot verify the accuracy of the reported CQI value at the time the user equipment 108 attempts to connect to the eNodeB 116.

In one embodiment, the reported CQI value may be transmitted periodically (e.g., every 20 milliseconds (ms), every 100 ms, every 200 ms, and so forth) on the PUCCH (Physical Uplink Control Channel) or the PUSCH (Physical Uplink Shared Channel) by the user equipment 108 and settable by the eNodeB 116 to describe channel conditions that the user equipment 108 is experiencing when the user equipment 108 is in a radio resource control (RRC) connected mode (e.g., an active mode). To probe into certain frequency specific impairments, the eNodeB 116 may also command the user equipment 108 to measure the wide band reported CQI value and or the sub-band reported CQI value. The sub-band CQI value may be particularly useful to identify a more favorable band to carry the downlink traffic and/or to avoid narrow-band interferer(s).

FIG. 1 illustrates a simplified state diagram 130 for the UEs 108, 110, 112 and 114. For example, if there is no user data exchanged between the eNodeB 120 and the UE 114 for a pre-set inactivity timer period (e.g., typically set at 2 seconds to 5 seconds), the UE 114 will go to an RRC-idle mode 134 (e.g., an inactive mode). The UE 114 will no longer send in the reported CQI values. The UE 114 may resume sending the reported CQI values when the UE 114 is required to transition back to a RRC-connected mode 132.

If the reported CQI value deviates from the channel condition, the deviation can add to the costs of the service provider of the IP network 102. For example, if the reported CQI value is under-reported, the under-reporting may lead to under utilization of the IP network 102 resulting in loss of revenue from additional data that could have been handled, resulting in taking up more spectral resources to support the data throughput rate by the IP network 102. On the other hand, if the reported CQI value is over-reported, the over-reporting may lead to over utilization of the IP network 102 resulting in loss of revenue due to dealing with more frequent retransmission, longer latency delay and lower data throughput rate, which results in lower overall spectral efficiency, and so forth.

In one embodiment, the reported CQI value may be adjusted to a calibrated CQI value to meet a target bit error rate (e.g., 10%). Thus, the bit error rate may be continuously monitored as the UEs 108, 110, 112 and 114 periodically transmit the reported CQI values. Based on historical data that is collected, the reported CQI values may not achieve the target bit error rate and the calibrated CQI value may be applied. In one embodiment, the calibrated CQI value may also periodically be updated as channel conditions change.

In one embodiment, for the UEs associated with a particular eNodeB, the eNodeB may collect the reported CQIs from the UEs and track the historical data for the duration that a UE is in the RRC connected mode 132. For example, the eNodeB 116 may track historical reported CQI data for the UE 108 while the UE is in the RRC connected mode. The eNodeB 116 may locally correlate the reported CQI values that are periodically transmitted by the UE 108 with measured block error rates to yield the calibrated CQI value. The eNodeB 116 may track the make, model and software versions of the UEs 108 and 110 with geographical location, time of day, during which the UEs 108 and 110 are in the RRC connected mode 132.

In one embodiment, the eNodeBs 116, 118 and 120 may collect and store a large amount of data in the DBs 122, 124 and 126. Thus, in one embodiment, the collected historical reported CQI value data may be periodically collected from the DBS 122, 124 and 126 of the eNodeBs 116, 118 and 120, respectively, in different geographical locations and transmitted to the AS 104. The historical data may be processed and correlated by the AS 104 at a network wide level, rather than at a local level for particular region, and stored in the DB 106. For example, as opposed to tracking individual UEs 108, 110, 112 and 114 as performed by the eNodeBs 116, 118 and 120, the AS 104 may track the performance of all UEs 108, 110, 112 and 14 over all different geographical locations where the eNodeBs 116, 118 and 120 are located. For example, the data may be processed to correlate a reported CQI value for a particular user equipment's make (e.g., manufacturer or brand), model, and software version (e.g., a particular firmware version), a particular geographical location (e.g., city, state, landmark, stadium, and the like), at a particular time of day or year (e.g., new years eve, a national holiday, rush hour in the morning and rush hour in the evening, and the like), a particular band (e.g., a wide band or a sub-band), and the like.

Based on the data, the eNodeBs 116, 118 and 120 may be modified to use a calibrated modulation and a calibrated coding rate based on a calibrated CQI value obtained from the historical data instead of the initial modulation and the initial coding rate based on the CQI value received from the UEs 108, 110, 112 and 114. For example, the user equipment 112 may be in San Francisco, Calif. at 6 PM on a Wednesday. The user equipment 112 may transmit a reported CQI value of 8. Based on the CQI table 202, the eNodeB 118 may initially set the modulation to 16 QAM and a coding rate of 490.

However, based on the historical data, the AS 104 may have determined that the CQI value of the make, model and software of the user equipment 112 during rush hour in San Francisco, Calif. is actually a 6 and not an 8. In one embodiment, the historical data may be reported from the AS 104 to the eNodeB 118 when the user equipment 112 attempts to connect to the eNodeB 118. In another embodiment, the eNodeB 118 may be configured with the historical data that is processed by the AS 104 in advance in a table form. In another embodiment, the eNodeB 118 may use the historical reported CQI values from the UE 112 while the UE 112 is in the RRC connected mode 132 that are stored in the local DB 124. As a result, the eNodeB 118 may look up one or more of the various parameters (e.g., make, model, software, geographic location, communication band, time, date, and the like) in the table to determine the calibrated CQI based on the historical data.

In another example, the user equipment 114 may be in a rural town on a weekend morning and transmit a reported CQI of a 7 when connecting with the eNodeB 120. However, based on the historical data, the calibrated CQI may be determined to be an 11. As a result, rather than using the initial modulation of 16 QAM and a coding rate of 378, the eNodeB 120 may apply a calibrated modulation of 64 QAM and a coding rate of 567.

As a result, embodiments of the present disclosure ensure that a calibrated CQI value is applied to select a more accurate MCS to the connection with a user equipment. In other words, embodiments of the present disclosure calibrate the CQI value to compensate for the under reporting or over reporting of the reported CQI value from a UE.

In one embodiment, the AS 104 or the eNodeBs 116, 118 and 120 may calculate a difference between the reported CQI value from the UEs 108, 110, 112 and 114 and the actual calibrated CQI value based on the historical data. The difference may then be provided to one of a variety of different applications.

In one embodiment, the applications may be to improve the proprietary algorithms for calculating the reported CQI value by the UEs 108, 110, 112 and 114. For example, the communication network service provider may provide the difference in the reported CQI values to the manufacturer of the UEs 108, 110, 112 and 114 to allow the manufacturers to calibrate the proprietary algorithms. As a result, future reported CQI values calculated and transmitted by the UEs 108, 110, 112 and 114 will be more accurate. In other words, the differences may be provided to improve a capability of the UEs 108, 110, 112 and 114 to accurately calculate and transmit a reported CQI value.

In another embodiment, the application may include grading a performance of the UEs 108, 110, 112 and 114 based on the difference. The communication network service provider may use the grading to decide which UEs 108, 110, 112 and 114 to continue to support or carry on the service provider's network. The grading may also be used as leverage for future negotiations with the respective manufacturers to carry the UEs 108, 110, 112 and 114.

In another embodiment, the difference in reported CQI values and the calibrated CQI values may be used to identify a network coverage area that requires an improvement based on the difference. For example, a particular geographical location may consistently apply a calibrated CQI value that is lower than the reported CQI value transmitted by the UEs 108, 110, 112 and 114. However, in other locations a calibrated CQI value may be applied to UEs 108, 110, 112 and 114 that are similar to the reported CQI value transmitted by the UEs 108, 110, 112 and 114. As a result, the communication network service provider may determine that improvements need to be made (e.g., additional towers, additional capacity, and the like) to the particular geographical location that has the lower calibrated CQI value.

In another embodiment, the difference in reported CQI values and the calibrated CQI values may be used as a component for calculating a composite score to rank a priority for network performance optimization. For example, the composite score may be calculated based on a variety of components including a geographic location, a deployment environment morphology (e.g., dense urban, urban, sub-urban, rural, and the like), a subscriber density, a projected subscriber density growth rate, subscriber values (e.g., platinum, gold, regular, and the like) statistics, traffic demand and the calibrated CQI values.

In one embodiment, the composite score may be used to rank priority for network performance optimization. For example, the service provider may have X amount of dollars for capital expenditures and improvements to the communication network 100. Based on the composite score for different geographical regions, the service provider may prioritize which geographic regions may require an upgrade in network performance using some of the X amount of dollars.

In another embodiment, the difference between the calibrated CQI values and the reported CQI values, the calibrated CQI values or the reported CQI values in various geographic areas and channel conditions may be sold to a third party. The information may be valuable to other service providers that may be providing communication services to other UEs having a similar make, model and firmware version. By selling the data to third parties, the third parties may provide better service to the third parties' customers.

As a result, the embodiments of the present disclosure may identify a calibrated CQI value compared to the reported CQI value transmitted by the UEs 108, 110, 112 and 114. Identifying the calibrated CQI value allows the network to apply the correct MCS to optimize the network. In addition, the difference in the calibrated CQI value and the reported CQI value calculated and transmitted by the UEs 108, 110, 112 and 114 may be provided to a variety of applications to allow the manufacturers to improve the UEs algorithms for calculating the reported CQI value and identifying improvement areas within the service provider's network.

Figure 3:
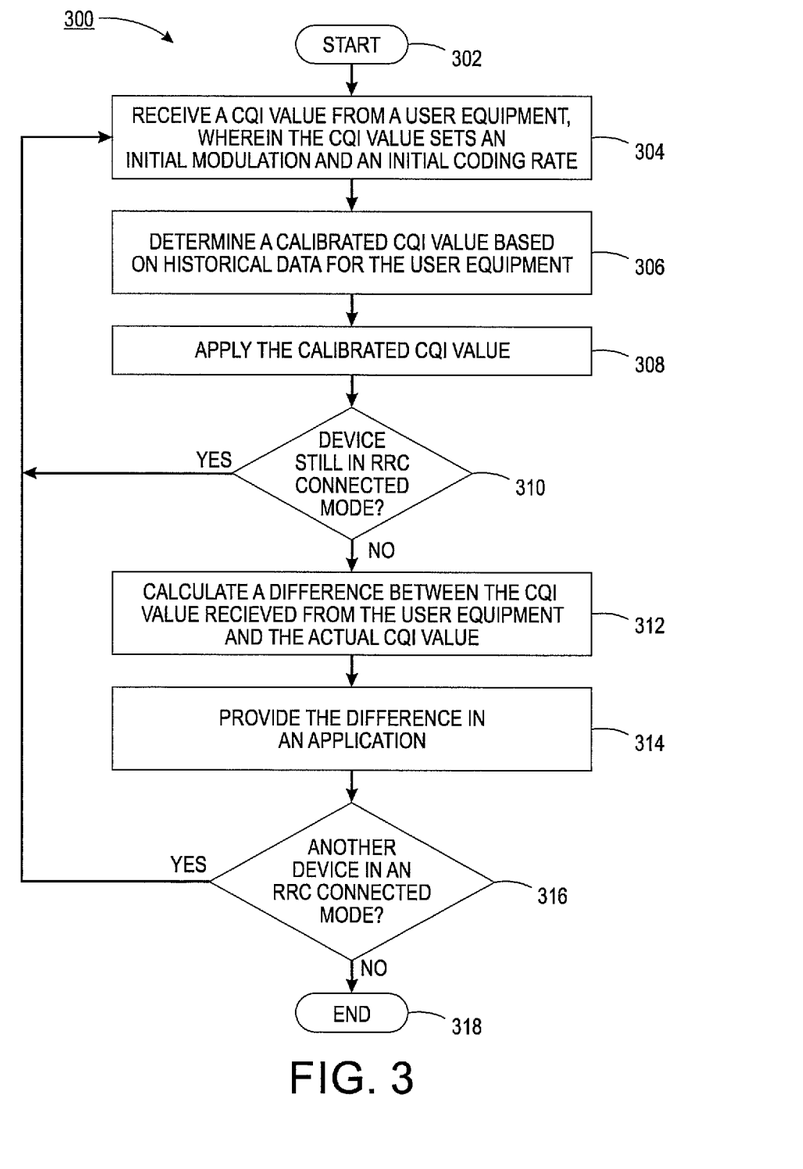
FIG. 3 illustrates a flowchart of an example method for optimizing network performance.

FIG. 3 illustrates a flowchart of a method 300 for optimizing network performance in accordance with the present disclosure. In one embodiment, steps, functions and/or operations of the method 300 may be performed by an AS 104. In one embodiment, the steps, functions, or operations of method 300 may be performed by a computing device or system 400, and/or processor 402 as described in connection with FIG. 4 below. For illustrative purpose, the method 300 is described in greater detail below in connection with an embodiment performed by a processor, such as processor 402.

The method 300 begins in step 302. At step 304, a processor receives a reported CQI value from a user equipment, wherein the reported CQI value sets an initial modulation and an initial coding rate. In one embodiment, the reported CQI value may be reported periodically (e.g., every 20 milliseconds (ms), every 100 ms, every 200 ms, and so forth) by the user equipment and settable by the eNodeB to acquire channel conditions that the user equipment is experiencing. The user equipment in a radio resource control (RRC) connected mode (e.g., an active mode) may be required to transmit the reported CQI value to the eNodeB. To probe into certain frequency specific impairments, the eNodeB may also ask the user equipment for the user equipment to measure the wide band CQI value and or the sub-band CQI value. The sub-band CQI value may be particularly useful to identify a more favorable band to carry the downlink traffic.

At step 306, the processor determines a calibrated CQI value based on historical data for the user equipment. In one embodiment, if the UE has connected to the eNodeB for the first time, the calibrated CQI value that is applied may be the same as the reported CQI value transmitted by the UE. In another embodiment, historical reported CQI data may be collected from the eNodeBs in different geographical locations over a period of time. The historical data may be processed and correlated. For example, the data may be processed to correlate a calibrated CQI value for a particular user equipment's make (e.g., manufacturer or brand), model, and software version (e.g., a particular firmware version), a particular geographical location (e.g., city, state, landmark, stadium, and the like), at a particular time of day or year (e.g., new years eve, a national holiday, rush hour in the morning and rush hour in the evening, and the like), a particular band (e.g., a wide band or a sub-band), and the like. The calibrated CQI value may be provided by the AS based on the historical data to provide a calibrated CQI value for a first time connection by a UE.

However, if the UE has been connected to the eNodeB, the historical data for the duration of the RRC connected mode of the UE may be collected, analyzed and correlated to a calibrated CQI value. In one embodiment, the calibrated CQI value may be based on a monitored block error rate (BER). For example, the eNodeB may be set to have a 10% BER and the reported CQI value transmitted by the UE may be adjusted to the calibrated CQI value based on the historical data to achieve the 10% BER.

At step 308, the processor applies the calibrated CQI value. A calibrated modulation and a calibrated coding rate based on the calibrated CQI value instead of the initial modulation and the initial coding rate based on the reported CQI sent by the user equipment. For example, based on the data the eNodeBs may be modified to use a calibrated modulation and a calibrated coding rate based on the calibrated CQI value obtained from the historical data instead of the initial modulation and the initial coding rate based on the reported CQI value received from the UEs.

At step 310, the processor determines if the UE is still in an RRC connected mode. If the UE is still in an RRC connected mode, the UE will be transmitting reported CQI values. In one embodiment, the method 300 may continuously monitor the BER to yield the calibrated CQI based on the measured BER.

At step 312, the processor calculates a difference between the reported CQI value received from the user equipment and the calibrated CQI value. For example, the calibrated CQI value determined based upon the historical data may be different than the reported CQI value transmitted by the user equipment.

At step 314, the processor provides the difference in an application. In one embodiment, the application may be to improve the proprietary algorithms for calculating the reported CQI value by the UEs. For example, the communication network service provider may provide the difference in the CQI values to the manufacturer of the UEs to allow the manufacturers to calibrate the proprietary algorithms. As a result, future reported CQI values calculated and transmitted by the UEs will be more accurate. In other words, the differences may be provided to improve a capability of the UEs to calculate and transmit a more accurate reported CQI value.

In another embodiment, the application may include grading a performance of the UEs based on the difference. The communication network service provider may use the grading to decide which UEs to continue to support or carry on the service provider's network. The grading may also be used as leverage for future negotiations with the respective manufacturers to carry the UEs.

In another embodiment, the difference in CQI values may be used to identify a network coverage area that requires an improvement based on the difference. For example, a particular geographical location may consistently have a calibrated CQI value that is lower than the reported CQI value transmitted by the UEs. However, in other locations a calibrated CQI value may be applied to the UEs that are similar to the reported CQI value transmitted by the UEs. As a result, the communication network service provider may determine that improvements need to be made (e.g., additional towers, additional capacity, and the like) to the particular geographical location that has the lower actual CQI value.

In another embodiment, the difference in CQI values may be used as a component for calculating a composite score to rank a priority for network performance optimization. For example, the composite score may be calculated based on a variety of components including a geographic location, a deployment environment morphology (e.g., dense urban, urban, sub-urban, rural, and the like), a subscriber density, a projected subscriber density growth rate, subscriber values (e.g., platinum, gold, regular, and the like) statistics, traffic demand and the calibrated CQI values.

In one embodiment, the composite score may be used to rank priority for network performance optimization. For example, the service provider may have X amount of dollars for capital expenditures and improvements to the communication network. Based on the composite score for different geographical regions, the service provider may prioritize which geographic regions may require an upgrade in network performance using some of the X amount of dollars.

In another embodiment, the difference between the calibrated CQI values and the reported CQI values, the calibrated CQI values or the reported CQI values in various geographic areas and channel conditions may be sold to a third party. The information may be valuable to other service providers that may be providing communication services to other UEs having a similar make, model and firmware version. By selling the data to third parties, the third parties may provide better service to the third parties' customers.

At step 316, the processor determines if there is another user equipment in an RRC connected mode. For example, many UEs may be connecting to the communication network and require a calibrated modulation and coding rate based on the calibrated CQI values. If there is another UE trying to connect to the communication network, the method 300 may return to step 304.

However, if there are no additional UEs trying to connect to the communication network, then the method 300 may proceed to step 318. At step 318, the method 300 ends.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

As such, the present disclosure provides at least one advancement in the technical field of communication networks. This advancement allows for optimizing network performance by selecting a proper MCS for a UE despite the MCS that should be selected based on a reported CQI of an endpoint. The present disclosure also provides a transformation of data. For example, historical CQI data is collected, correlated and transformed into a selection of a proper CQI value that determines the proper MCS for a UE despite the reported CQI of an endpoint.

Finally, embodiments of the present disclosure improve the functioning of a computing device, e.g., a server, a base station, an eNodeB and/or a UE. For example, an application server dedicated for automatically selecting the proper MCS for a UE despite a reported CQI from the endpoint that was not previously available.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for optimizing network performance, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, as discussed above, is implemented in a distributed or parallel manner for a particular illustrative example, i.e., the steps of the above method 300, or the entirety of method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for optimizing network performance (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for optimizing network performance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a processor, a reported channel quality indicator value from a user equipment, wherein the reported channel quality indicator value is used for setting an initial modulation and an initial coding rate;
determining, by the processor, a calibrated channel quality indicator value based on historical data for the user equipment, wherein the calibrated channel quality indicator value is based on a make, a model and a software version of the user equipment; and
applying, by the processor, a calibrated modulation and a calibrated coding rate based upon the calibrated channel quality indicator value instead of the initial modulation and the initial coding rate based on the channel quality indicator value received from the user equipment, wherein the receiving, the determining and the applying are continuously performed while the user equipment is in a radio resource control connected mode.

2. The method of claim 1, further comprising:
calculating, by the processor, a difference between the reported channel quality indicator value received from the user equipment and the calibrated channel quality indicator value; and
providing, by the processor, the difference in an application.

3. The method of claim 2, wherein the application comprises reporting the difference to a manufacturer of the user equipment for improving a capability of the user equipment to calculate and transmit the reported channel quality indicator value.

4. The method of claim 2, wherein the application comprises grading a performance of the user equipment based on the difference.

5. The method of claim 2, wherein the application comprises identifying a network coverage area that requires improvement based on the difference.

6. The method of claim 2, wherein the application comprises calculating a composite score that is based on the difference to rank a priority for network performance optimization.

7. The method of claim 2, wherein the application comprises selling the difference as information to a third party.

8. The method of claim 1, wherein the calibrated channel quality indicator value is further determined based on monitoring a block error rate.

9. A non-transitory computer-readable medium storing instructions which, when executed by a processor, cause the processor to perform operations, the operations comprising:
receiving a reported channel quality indicator value from a user equipment, wherein the reported channel quality indicator value is used for setting an initial modulation and an initial coding rate;
determining a calibrated channel quality indicator value based on historical data for the user equipment, wherein the calibrated channel quality indicator value is based on a make, a model and a software version of the user equipment; and
applying a calibrated modulation and a calibrated coding rate based upon the calibrated channel quality indicator value instead of the initial modulation and the initial coding rate based on the channel quality indicator value received from the user equipment, wherein the receiving, the determining and the applying are continuously performed while the user equipment is in a radio resource control connected mode.

10. The non-transitory computer-readable medium of claim 9, wherein the operations further comprising comprise:
calculating a difference between the reported channel quality indicator value received from the user equipment and the calibrated channel quality indicator value; and
providing the difference in an application.

11. The non-transitory computer-readable medium of claim 10, wherein the application comprises reporting the difference to a manufacturer of the user equipment for improving a capability of the user equipment to calculate and transmit the reported channel quality indicator value.

12. The non-transitory computer-readable medium of claim 10, wherein the application comprises grading a performance of the user equipment based on the difference.

13. The non-transitory computer-readable medium of claim 10, wherein the application comprises identifying a network coverage area that requires improvement based on the difference.

14. The non-transitory computer-readable medium of claim 10, wherein the application comprises calculating a composite score that is based on the difference to rank a priority for network performance optimization.

15. The non-transitory computer-readable medium of claim 10, wherein the application comprises selling the difference as information to a third party.

16. The non-transitory computer-readable medium of claim 9, wherein the calibrated channel quality indicator value is further determined based on monitoring a block error rate.

17. An apparatus, comprising:
a processor; and
a computer-readable storage device storing a plurality of instructions which, when executed by the processor, cause the processor to perform operations, the operations comprising:

receiving a reported channel quality indicator value from a user equipment, wherein the reported channel quality indicator value is used for setting an initial modulation and an initial coding rate;

determining a calibrated channel quality indicator value based on historical data for the user equipment, wherein the calibrated channel quality indicator value is based on a make, a model and a software version of the user equipment; and applying a calibrated modulation and a calibrated coding rate based upon the calibrated channel quality indicator value instead of the initial modulation and the initial coding rate based on the channel quality indicator value received from the user equipment, wherein the receiving, the determining and the applying are continuously performed while the user equipment is in a radio resource control connected mode.

18. The apparatus of claim 17, wherein the operations further comprise:

calculating a difference between the reported channel quality indicator value received from the user equipment and the calibrated channel quality indicator value; and providing the difference in an application.

* * * * *